United States Patent
Shen et al.

(10) Patent No.: US 7,299,362 B2
(45) Date of Patent: Nov. 20, 2007

(54) APPARATUS OF A BASELINE DVB-CPCM

(75) Inventors: Sheng Mei Shen, Singapore (SG); Ming Ji, Singapore (SG); Zhongyang Huang, Singapore (SG); Jek Thoon Tan, Singapore (SG); Takanori Senoh, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 794 days.

(21) Appl. No.: 10/490,394

(22) PCT Filed: Oct. 28, 2002

(86) PCT No.: PCT/JP02/11126

§ 371 (c)(1),
(2), (4) Date: Apr. 7, 2004

(87) PCT Pub. No.: WO03/039155

PCT Pub. Date: May 8, 2003

(65) Prior Publication Data

US 2005/0022227 A1    Jan. 27, 2005

(30) Foreign Application Priority Data

Oct. 29, 2001    (JP)    ............................. 2001-330827

(51) Int. Cl.
*G06F 1/24*    (2006.01)
(52) U.S. Cl. .................. 713/189; 713/193; 713/155
(58) Field of Classification Search ................ 713/189, 713/193, 155
See application file for complete search history.

(56) References Cited

U.S. PATENT DOCUMENTS

| | | | |
|---|---|---|---|
| 5,144,665 | A | 9/1992 | Takaragi et al. |
| 6,353,892 | B2 | 3/2002 | Schreiber et al. |
| 6,535,919 | B1 | 3/2003 | Inoue et al. |
| 2001/0053222 | A1 | 12/2001 | Wakao et al. |
| 2003/0149890 | A1 | 8/2003 | Shen et al. |
| 2004/0054892 | A1 | 3/2004 | Ji et al. |

FOREIGN PATENT DOCUMENTS

| | | |
|---|---|---|
| EP | 0766471 | 4/1997 |
| EP | 0913997 | 5/1999 |
| EP | 0957606 | 11/1999 |
| EP | 0969668 | 1/2000 |
| EP | 1041819 | 10/2000 |

(Continued)

OTHER PUBLICATIONS

English Language Abstract of JP10-257046.

(Continued)

*Primary Examiner*—Thomas R. Peeso
(74) *Attorney, Agent, or Firm*—Greenblum & Bernstein, P.L.C.

(57) ABSTRACT

A Baseline DVB-CPCM is presented in this proposal to provide a secure and interoperable content delivery and transferring apparatus. The proposed Baseline DVB-CPCM is a unit to be implemented in a compliant CPCM device, and it consists of five major modules to be used for end-to end solution and content transferring between devices. These modules are CPCM Manager, Tools Box, Rights Management Module, Message Router, and CAS-CPCM Converter.

14 Claims, 7 Drawing Sheets

FOREIGN PATENT DOCUMENTS

| | | |
|---|---|---|
| EP | 1079627 | 2/2001 |
| JP | 8-331543 | 12/1996 |
| JP | 10-51778 | 2/1998 |
| JP | 10-51779 | 2/1998 |
| JP | 10-257046 | 9/1998 |
| JP | 11-331310 | 11/1999 |
| JP | 2000-83022 | 3/2000 |
| JP | 2000-083022 | 3/2000 |
| JP | 2000-101853 | 4/2000 |
| JP | 2000-287206 | 10/2000 |
| JP | 2001-078007 | 3/2001 |
| JP | 2001-359070 | 12/2001 |
| WO | 99/48296 | 9/1999 |
| WO | 01/91052 | 11/2001 |
| WO | 02/071752 | 9/2002 |
| WO | 02/100037 | 12/2002 |

OTHER PUBLICATIONS

English Language Abstract of JP2000-83022.
English Language Abstract of JP 2000-083022.
English Language Abstract of JP 2000-287206.
English Language Abstract of JP 10-257046.
English Language Abstract of JP 11-331310.
English Language Abstract of JP 8-331543.
English Language Abstract of JP 2000-101853.
English Language Abstract of JP 10-51778.
English Language Abstract of JP 10-51779.
English Language Abstract of JP 2001-078007.
English Language Abstract of JP 2001-359070.
DVB: "Call for Proposals for Content Protection and Copy Management Technologies", which was downloaded from www.cptwg.org/Assets/DVB-CPT-CfP_rev1.2.PDF on Feb. 10, 2003.
R. Koenen, "Intellectual Property Management and Protection in MPEG Standards," which was downloaded from www.cselt.it/mpeg/standards/ipmp on Sep. 24, 2001.
B.J. Van Rijnsoever et al., Interoperable Content Protection for Digital TV, which was published on Jul. 30, 2000.
Electronics, No. 554, Nippon, Chumu Sha, Jul. 1, 2000, pp. 51-54.

APPARATUS OF A BASELINE DVB-CPCM

TECHNICAL FIELD

The present invention relates to content protection and copy management used in broadcasting, content distribution, Video-On-Demand, especially to such applications where the protected content is delivered, and transferred between devices which can consume the content and save the content in a storage in a secure manner.

BACKGROUND ART

Contents will be available easily to consumers as digital technology and media processing power become more and more advanced. Not like analogue media, digital media almost has unlimited number of copies with good quality. Thus as content owner, or content operator they will have much concern about the dangerous if content is not protected well.

Digital TV (DTV) broadcasting has been widely deployed in the world. So far there is not much concern about the content protection and security. However as new generation DTV-STB (Set-Top-Box) that has local hard disk and digital interface like IEEE 1394, etc. is launched, content association, movie industries, and media owners are starting to worry about the content protection and copy management. Before having a complete and very secured DTV-STB, a secured content delivery and transferring mechanism, as well as a secured transmission channel, they would not allow to release contents to such applications. Therefore many parties in the world including standard bodies like MPEG, DVB, TVAnytime, content companies, CE (Consumer Electronics) manufacturers, as well as security technology providers, etc., are gathering together to work on a both interoperable and secure end-to-end solution to the content protection and copy management in such application scenario.

Content distribution and video-on-demand is also becoming more and more demanding as multimedia data and contents can reach to anywhere and anytime. User is happy with the convenience and flexibility, and they can enjoy entertainment easily and efficiently.

On the other hand, content owners are trying to meet the customer's needs but at the same time they also worry about the illegal usage of their property. There is a balance between two sides.

In MPEG standardisation group, people are working towards to standardise an IPMP (Intellectual Property Management and Protection) system that involves compliant terminal. All the terminals can play back a protected content that is encrypted and protected by following the same IPMP standard, no matter what kinds of IPMP tools they use.

DVB consortium has also issued Call for Proposal for CPCM (Content Protection and Copy Management), to mainly focus on content delivery from operator to receiver and content transferring from one DVB-CPCM device to another in a both secure and interoperable manner.

The current DVB receiver as a DVB device cannot fulfil the both secure and interoperable requirement, especially for content transferring between DVB receiver and other storage devices like PVR, etc., which has not addressed before.

Figure 1:
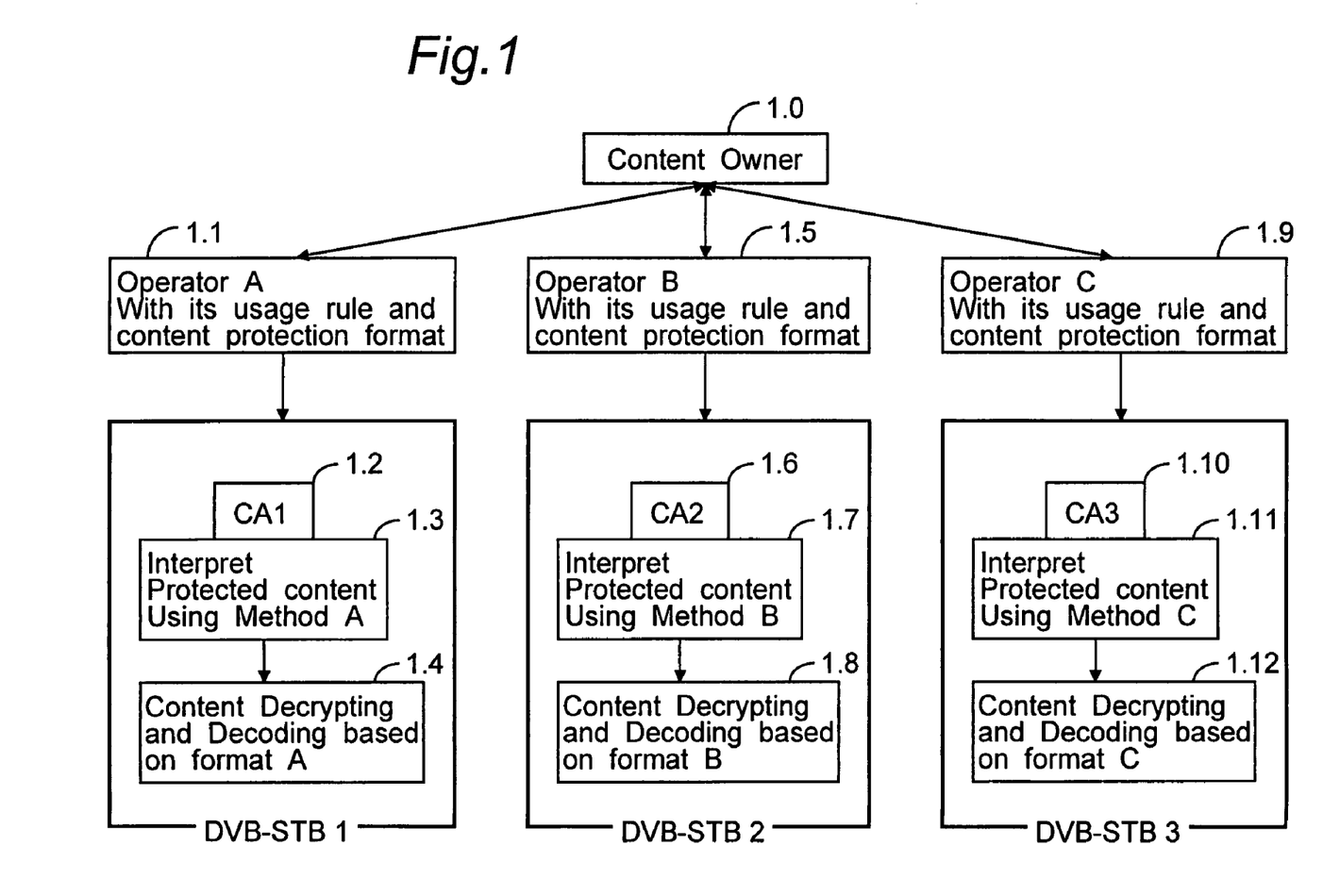
FIG. 1 shows the prior art of an Existing DVB-STB to Receive Protected Content by using Different CA Systems.

Basically the prior art for an existing DVB receiver is shown in FIG. 1, to indicate how a content is delivered to DVB receiver in a secure but private way.

Related invention is disclosed in Japanese Patent Application Nos. 2001-265908 and 2001-058236 which are filed by the present applicant.

To design an interoperable and secure device to be used in content delivery or transmission in a secure manner;

To design an interoperable and secure device to be used in content transferring between such devices in a secure manner;

In the above-mentioned cases, content is protected against illegal use of the property and granted usage is properly managed and carried from one device to another within authorised domain.

DISCLOSURE OF INVENTION

The device according to the present invention has the following elements.

A means for using a standardized Baseline DVB-CPCM unit to be implemented in a compliant CPCM Device;

A means for using sub modules of the Baseline DVB-CPCM, as well as their functions and behaviours;

A means for using a set of messages for content transferring, tool transferring, mutual authentication between compliant CPCM Devices, as well as interfacing with proprietary CPCM tools (plug-ins);

A means for using a set of identifiers for content management and domain management;

A means for using CPCM Information and their sub information which is carried in a content, as well as a set of syntaxes and their semantics for such information to indicate the format of a protected content where protection information and content usage information are embedded. It is used by content provider or service operator as the standard mean to wrap up content with other information, and at the same time it is used by CPCM Device makers as the specification to build their compliant CPCM Devices.

A means for using a unified and generic XML based schema to be able to express various kinds of usage rights and rules by different parties.

According to a device of the present invention, the invention of Baseline DVB-CPCM solves the problem of protecting digital content from broadcasting, copying and/or transferring, and it provides good interoperability.

The invented Baseline DVB-CPCM is the unit to be implemented in a compliant CPCM device, and it consists of five modules to realise most of the functions requested by security and interoperability. CPCM Control Information and CPCM Stream are defined in to provide specification for both operator and manufacturer to follow to have worldwide inter-operability, it includes CPCM Tool List, Rights Holder, and Tool Container. In specifying a compliant CPCM Device, a Baseline DVB-CPCM is invented including CPCM Manager, Tools Box, Rights Management, Message Router, and CAS-CPCM converter, to fulfil most of the functions for content protection and copy management Messaging interface and several messages are defined here for content or tool transferring between CPCM Devices, as well as for interfacing with proprietary CPCM plug-ins.

XML structured or binary rights language can be included in CPCM Rights Holder to provide usage rules associated with each content, program or even elementary streams.

BEST MODE FOR CARRYING OUT THE INVENTION

In the present invention, a parameter named "authorized domain" is newly provided, which specifies one or more local networks. Only reproduction/recording devices within the local network specified by the authorized domain can be authorized to perform one of reproduction and copy of CPCM (content protection and copy management) protected content so that the content can be fully secured in transferring between the devices within the network.

The authorized domain is defined when a user makes a contract of content subscription with a content provider. Terms of the contract may be varied according to characteristics of the local network such as numbers and/or types of the devices within the local network assigned the same domain.

For example, the authorized domain can be set by adopting a part of an IP address of the device within the local network. More specifically, in the case of the device with an IP address "dvdplayer1.seno.drl.mei.co.jp", the authorized domain may be "seno.drl.mei.co.jp". Then, all the devices having IP address "seno.drl.mei.co.jp" can be authorized to perform one of reproduction and copy of the contracted content. Note that a domain specifies a logical unit of a connection between the devices, which are not necessary in the form of a network.

The basic structure of the invention is first explained.

(1) On the Content Provider or Operator Side in a CPCM Environment:
1. Content is encoded using existing coding technology like MPEG-2 or MPEG4, and encrypted using existing and defined encryption tools like DES or AES. Watermarks for copy control maybe embedded in the content before the encoding. The encryption key is encrypted again using pre-defined encryption tool, to result in an encrypted encryption key and the license key that is used to encrypt the encryption key.
2. At the same time, the ContentID is generated.
3. CPCM Tools List indicated by ToolID is also formed based on what tool is used to protecting the content.
4. CPCM Rights Holder contains usage rights and rules specified by content owner. These usage rights and rules can be made specific to each piece of content (by using of ContentID), or each program under one content (by using of programNumber in MPEG2 system), or even each elementary stream under one program (by using elementary_PID in MPEG2 system). The above-mentioned license key can be carried in CPCM Rights Holder, or it can be delivered to CPCM devices via some secure means, a return channel or smart card.
5. CPCM Control Graph is created if necessary according to the detail protection and usage rules applied to different control point;
6. CPCM Tool Container is formed by carrying necessary CPCM Tool in a protected format;
7. CPCM Stream is created to hold the above-mentioned encrypted encryption key and any other control information for protection, such as time stamps, tool configuration messages, etc.

All the above CPCM information is carried in PSI in MPEG-2 system standard, and it is called CPCM Control Information.

(2) On the Content Receiver Side in the Same CPCM Environment:

A protected content is delivered to a compliant CPCM Device, and Baseline DVB-CPCM unit will function by activating its sub modules:
1. Rights Management module will retrieve CPCM Rights Holder information. Usage rules and states associated with the content are parsed. These include usage rights of each program, elementary stream, copy information on whether or not the content (or a program) can be transferred between CPCM devices in the same authorized domain. If the license key is carried in CPCM Rights Holder, it is also retrieved after the Rights Management module makes sure that this device has the right to access a particular content or program. If not, the license key is obtained elsewhere through a secure means, maybe a smart card.
2. CPCM Manager module will retrieve CPCM Tool List and call up the tool indicated by ToolID in the list if there is such tool in Tools Box of Baseline DVB-CPCM. If there is no such tool in the case of a new tool or upgraded tool, missing tool downloading or retrieving will be conducted in three ways: sending ToolRequest to another CPCM Device; retrieving tools from the content (if there is tools carried in Tool Container Descriptor); remotely retrieving missing tool from a URL site. The newly obtained tool will be used as proprietary CPCM tools (plug-ins).
3. In the case of playback only, the license key stored in buffer of Baseline DVB-CPCM will be called to decrypt the encrypted encryption key in the CPCM Stream. The reconstructed key will be used to decrypt the encrypted content one unit by one unit synchronously, to play back the protected content without content storing.
4. In the case of storing content on the top of playback, Usage rules and rights carried in the CPCM Rights Holder will be further retrieved and verified to see whether there is copy right for this program or content. In the case of broadcasting, program number like ProgramNumber is used to identify the usage right applied to which program, while in the case of content distribution, ContentID will be used to identify the usage right applied to which content.

After usage rule verification performed, the protected content will be played back in the same way as indicated in the above-mentioned playback case. At the same time the encrypted content will be saved in the storage of a CPCM device, together with CPCM information (CPCM Tool List, CPCM Rights Holder, CPCM Control Graph, CPCM Tool Container, and CPCM Stream where the encryption key is not encrypted).

(3) Protected Content Transferring Between Two Compliant CPCM Devices:

It is assumed that the protected content stored in CPCM Device A, together with CPCM Control Information. CPCM Device B is owned by the same user and considered to be in the same authorized domain.

In the case of content distribution, the same CPCM_DomainID corresponding to one registered user has been issued as a certificate and registered to all user's CPCM devices when he makes subscription via a return channel, smart card, or other means.

This CPCM_DomainID as a certificate is securely transmitted, delivered, and registered into user's CPCM devices, or it is registered into user's CPCM devices via a plug-in smart card. This CPCM_DomainID registered in Baseline DVB-CPCM of user's CPCM devices is used as Hardware's identifier or authorized domain identifier.

A password assigned by the service operator may be used in this registration process. All the bill for pay-per-view or content purchase will be charged to users based on their own CPCM_DomainID and the password. All his registered CPCM devices are considered to be in the authorized domain with the same certificate of CPCM_DomainID.

Within the same domain, each of the CPCM Devices is also assigned a CPCM_DeviceID to identify itself and to be used as address for messages sending and receiving between two CPCM devices. Each CPCM device will also have a key generation module to generate a pair of public key and private key to use to encrypt and decrypt the encryption keys in CPCM Stream.

When CPCM Device B wants to obtain a protected content/program which is stored in the CPCM Device A, it will send a ContentRequest message to the device A, together with:
a) the ContentID/ProgramNumber of the requested content/program;
b) CPCM_DomainID in the device B;
c) the public key—PublicKey on-line generated by (or previously embedded in) Baseline DVB-CPCM of the device B;
d) the CPCM_DeviceID of the device B;

The Baseline DVB-CPCM of device A receives the ContentRequest messages with the CPCM_DomainID and the PublicKey, and it will verify:
a) whether device B is in the authorized domain. It is done by either doing a mutual authentication with Device B using certificates through mutual authentication messages, or simply by checking the received CPCM_DomainID against with its, own CPCM_DomainID;
b) whether there is such content/program with the ContentID/ProgramNumber (programNumber is used in broadcasting case);
c) Whether there is such copy right for the requested content/program by calling the Rights Management Module to check the usage rules carried in CPCM Rights Holder.
d) If the above-mentioned three steps are passed through, the encryption key carried by CPCM Stream which is stored in the device A, is encrypted by the received PublicKey and re-form a CPCM Stream attached to the protected content;
e) Finally the requested content will be transferred from the device A to the device B together with the CPCM information where some CPCM information may be changed;
f) If Copy right is Copy Once in the CPCM Rights Holder, then Copy Once will be changed into Copy No More;
g) If the copy right information is carried in video embedded by watermarking, then a watermarking extracting tool will be called up from Tools Box to extract the copy right information. In this case if the copy right is Copy Once, then a watermarking embedding tool will be called up to embed Copy No More to the same video content;

(4) CPCM Tool Transferring Between Two Compliant CPCM Devices:

It is assumed that CPCM Tools are stored in the module of Tools Box of Baseline DVB-CPCM in the CPCM Device A.

CPCM Device B receives a protected content and retrieves CPCM Tool List But when it is found that the tool required with ToolID is missing or cannot be found from the Tools Box of Baseline DVB-CPCM in the device B, the device B will send ToolRequest messages to the device A to request such tool, and the messages include:
a) the CPCM_DomainID of the device B;
b) the ToolID of the requested tool;
c) the CPCM_DeviceID of the device B;

CPCM Rights Management module in the device A receives the ToolRequest messages with the CPCM_DomainID and the ToolID, and it will verify:
a) whether device B is in the authorized domain. It is done by either doing a mutual authentication with Device B using certificates through mutual authentication messages, or simply by checking the received CPCM_DomainID against with its own CPCM_DomainID;
b) whether there is such tool with the ToolID, by looking up the tool table list stored in the local memory such as RAM which is inside the Baseline DVB-CPCM of the device A;
c) whether it is allowed for the tool to be transferred to another device even in the authorized domain, according to the transferring status for the requested tool;
d) If the above-mentioned three steps are passed through, the requested tool will be transferred from the device A to the device B together with its transferring status;

EMBODIMENT

A preferred embodiment of the invention will be described below with reference to the drawings.

FIG. 1 shows the prior art for the current typical DTV system, and DVB-STB with a private CA system is shown as the receiver here as an example.

In unit 1.0 Content Owner issues content to different operators with certain basic and common usage rules for the content;

In unit 1.1 Operator A creates protected content using its tool and format although MPEG-2 standard is used here for audio, video and system encoding. The format of usage rules, the protection mechanism including protection tools used here, is based on a proprietary specification A. So a CA module in unit 1.2 based on such specification B has to be used to attach to the DVB-STB 1, in order to be able to receive and interpret in unit 1.3, and consume the protected content in unit 1.4.

The same way is applied to Operator B and DVB-STB 2.

In unit 1.5 Operator B creates protected content using its tool and format although MPEG-2 standard is used here for audio, video and system encoding. The format of usage rules, the protection mechanism including protection tools used here, is based on a proprietary specification B. So a CA module in unit 1.6 based on such specification B has to be used to attach to the DVB-STB 2, in order to be able to receive and interpret in unit 1.7, and consume the protected content in unit 1.8.

The same way is applied to Operator C and DVB-STB 3.

In unit 1.9 Operator B creates protected content using its tool and format although MPEG-2 standard is used here for audio, video and system encoding. The format of usage rules, the protection mechanism including protection tools used here, is based on a proprietary specification C. So a CA module in unit 1.10 based on such specification C has to be used to attach to the DVB-STB 3, in order to be able to receive and interpret in unit 1.11, and consume the protected content in unit 1.12.

It is shown from the above mentioned situation, if DVB-STB 1 wants to receive and consume contents delivered by Operator B and C besides Operator A, user of DVB-STB 1 has to buy more than one CA systems which may cause much more than what user is not willing to pay.

On the other hand it is also not possible for such DVB-STB to fulfil secure content storing and secure content transferring between different devices by carrying the same usage rules.

Furthermore there is no any compatibility among all the existing CA systems, so that the cost for having the same DVB-STB be able to receive and consume contents from as many as operators would be very large to consumers. As new generation DVB-STB would have local storage embedded in the STB to not only receive but also store received content. Besides that, content transferring between such devices including Personal Video Recorder (PVR) would become demanding. So it is necessary to define a new DVB device to realise both interoperable and secure content delivery and transferring from end to end and also between such devices.

End-to-End Solution

Figure 2:
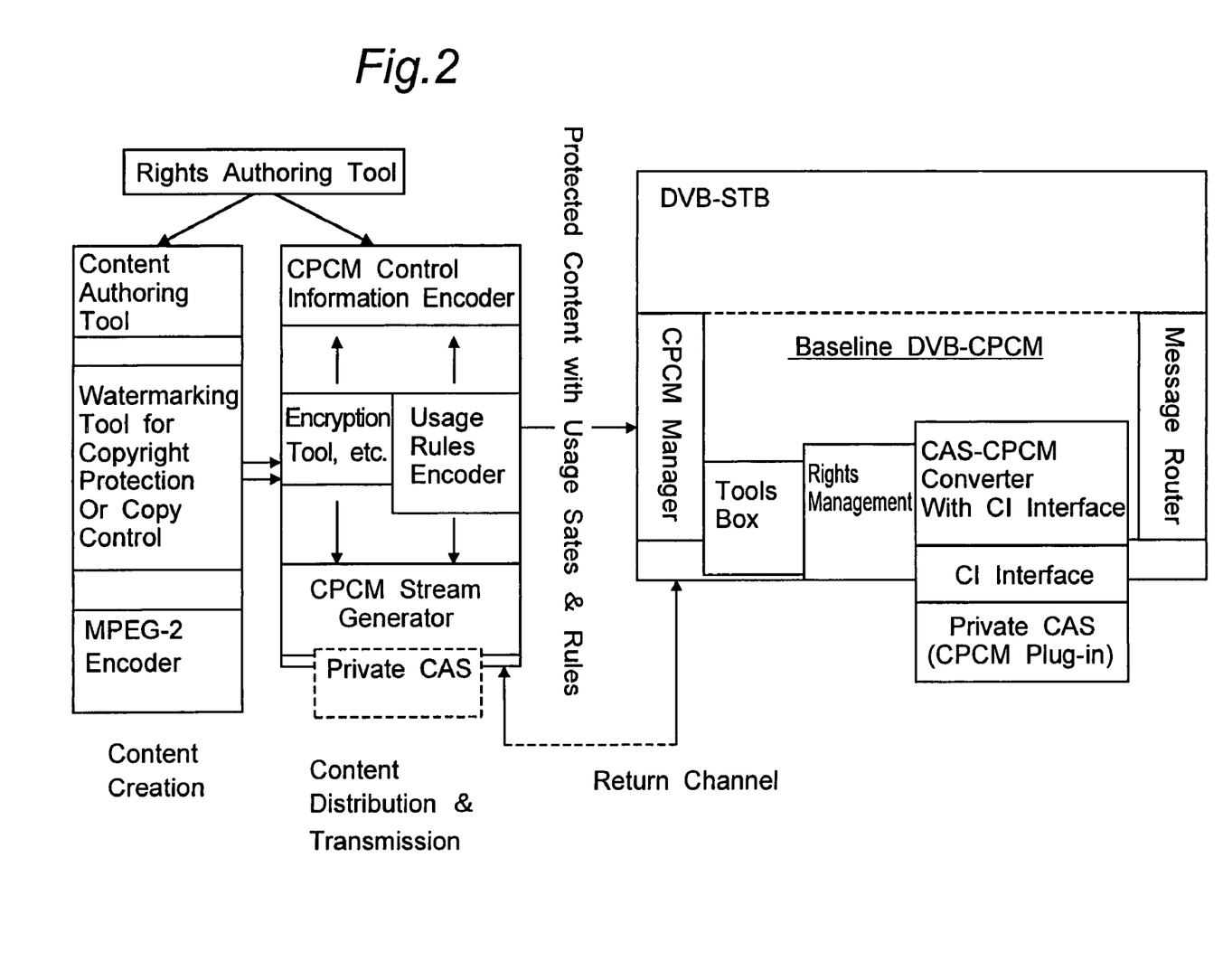
FIG. 2 shows the invented DVB CPCM STB with End to End Solution.

Based on this invention, a future compliant DVB CPCM STB will contain a Baseline DVB-CPCM Module that is pre-implemented or embedded in a DVB STB, shown as in FIG. 2.

An end to end solution based on DVB CPCM STB with the invented Baseline DVB-CPCM is illustrated in FIG. 2. The Baseline DVB-CPCM is specified, including its sub-function modules, CPCM Manager, Tools Box, Rights Management Module (Usage States & Rules Parser), CAS-CPCM Converter between a private CAS (ECM & EMM) and CPCM Usage States & Rules, as well as Message Router which transmits all necessary messages.

Figure 3:
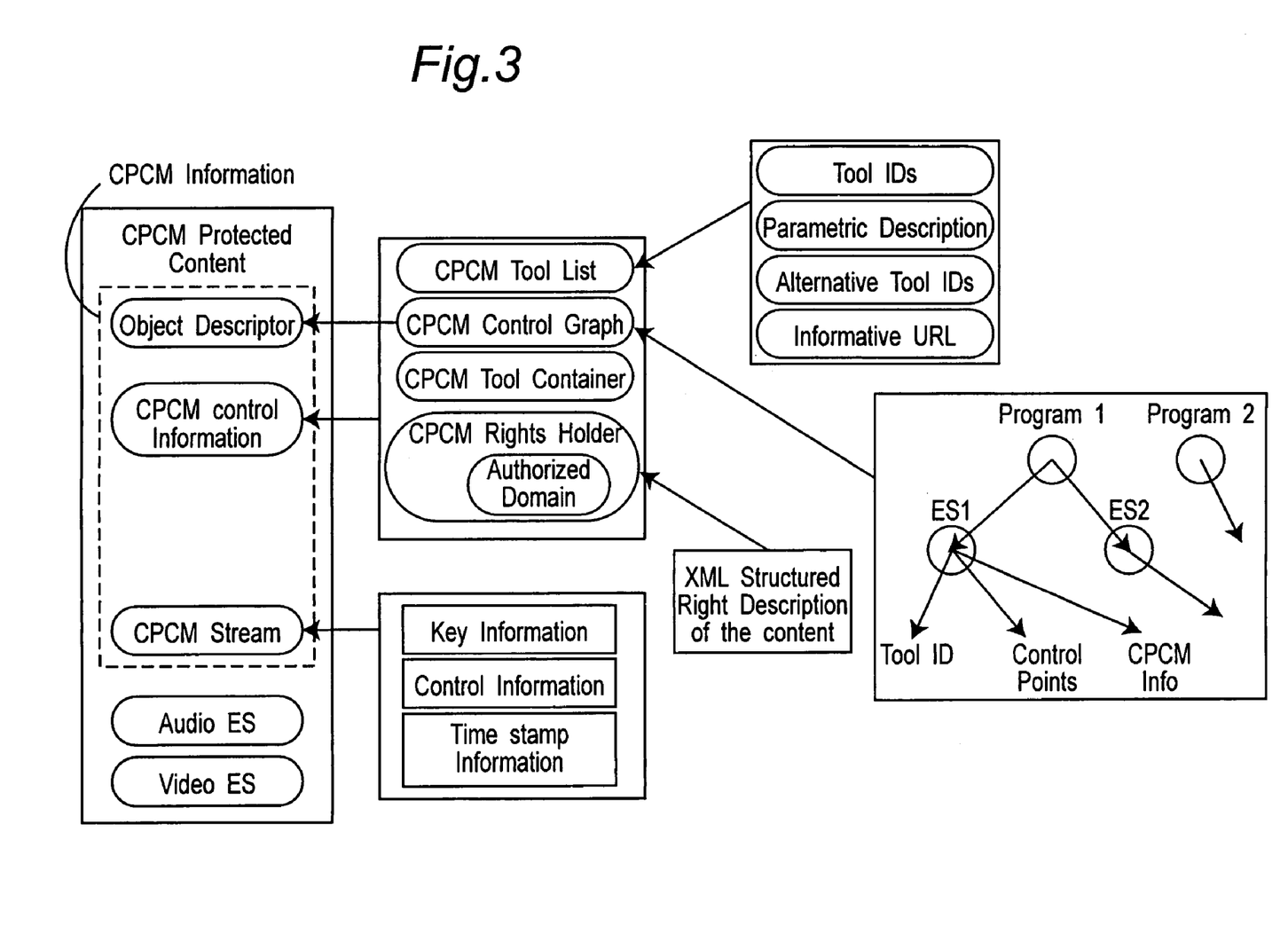
FIG. 3 shows the Structure of CPCM protected content—MPEG2 system.

FIG. 3, the structure of MPEG-2 content protected by CPCM system is shown.

As shown in FIG. 3 a CPCM protected content will contain CPCM Control Information including CPCM Tool List, CPCM Right Holder and CPCM Tool Container, as well as CPCM Stream. CPCM Control Information is carried in PSI (Program Service Information) in MPEG-2 system, while CPCM Stream is carried as a specific elementary stream.

There are two possible Use Cases for the above DVB CPCM STB.

1) In the Case Content is Protected and Managed by the Standardized DVB CPCM System:

Content will be encoded and encrypted with certain usage rules, and distributed/transmitted with other usage information that depends on user subscription, to DVB CPCM STB.

Here since all elements, like encryption tool, and usage rules encoding, are based on the CPCM system, so Baseline DVB-CPCM, which is embedded in the STB will call up the decryption tool in the Tools Box, parse the usage rules by Rights Management Module, and then process the protected content.

The encryption key is encrypted again and carried in a CPCM Stream. The key used to encrypt the encryption key, i.e., license key is either carried in Rights Holder, or made known to the DVB CPCM STB in some secure way, either via smart card, or via a return channel like modem line.

Figure 4:
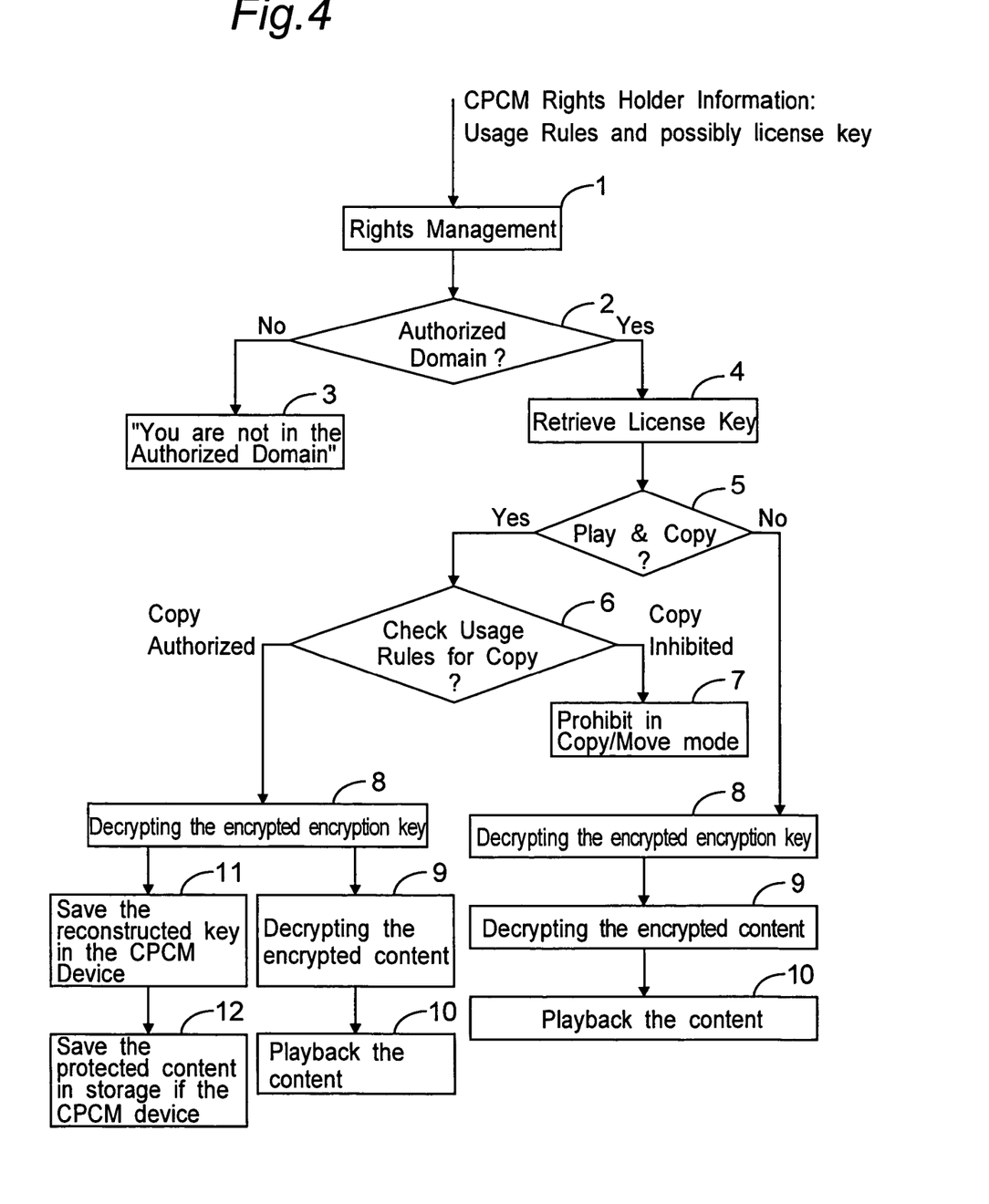
FIG. 4 shows Illustration of the Function of Rights Management used for End to End Solution in the Broadcasting Case.
Figure 5:
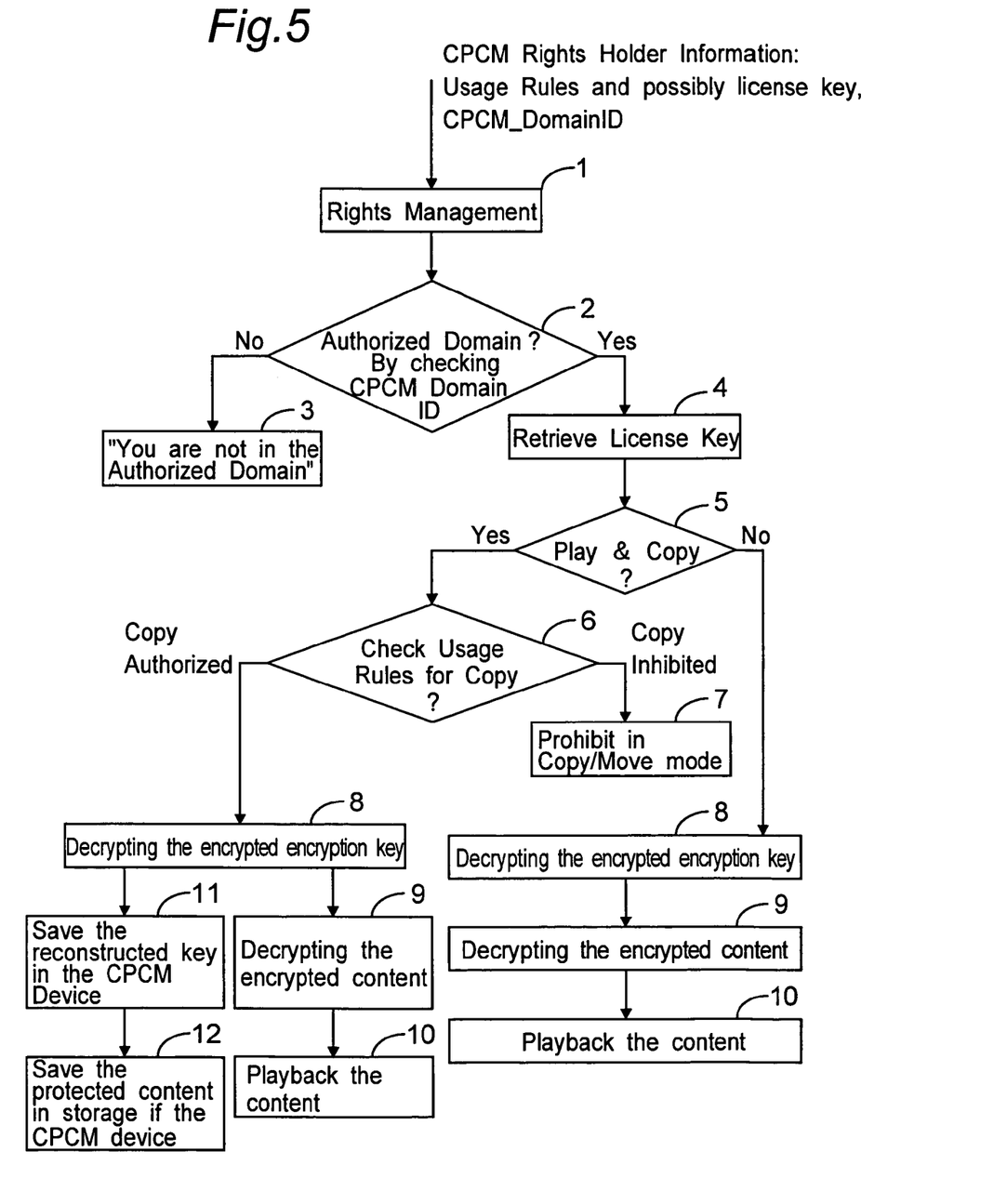
FIG. 5 shows Illustration of the Function of Rights Management used for End to End Solution in the content distribution case.

Rights Management module in the invented Baseline DVB-CPCM of a complaint CPCM device will act for the following functions, as shown in FIGS. 4 and 5.

In the FIG. 4 for the case of broadcasting, the protected content with its CPCM information is passed to Rights Management (RM) module in the unit 1, and CPCM Rights Holder will be retrieved in this module. Usage Rules and possibly the license key are carried in the CPCM Rights Holder.

In the first step in the unit 2 as shown in FIG. 4, RM checks the content carried in CPCM Rights Holder against the CPCM_DomainID which user is entitled to receive and has registered into users. CPCM device, to verify whether this device is eligible to consume the content.

If the above result is negative, then the RM will generate an output message saying: you are not authorized, as shown in unit 3.

If the above result is positive, then the RM will retrieves the license Key either from Rights Holder or smart card in unit 4 to be ready for decrypting the encrypted encryption key which is carried in the CPCM Stream.

In the next step, the RM will check user's request or preference between Play or Play & Copy in unit 5.

In the case of "Play only" requested by user, the retrieved License Key in unit 4 will be passed to unit 8 for decrypting the encrypted encryption key. The following step is to de-scramble the protected content in unit 9 and playback the content in unit 10.

In the case of Play & Copy request by user, the RM will retrieve the Usage Rules in unit 6 to verify whether there is copy right to save the current content (or program in broadcasting case) in the storage in the complaint CPCM device.

If the above result is negative, then the RM will generate an output message saying: Copy/Move is prohibited, as shown in unit 7.

If the above result is positive, then the retrieved License Key in unit 4 will be passed to unit 8 for decrypting the encrypted encryption key. The following step is to de-scramble the protected content in unit 9 and playback the content in unit 10. At the same time, in unit 11 the reconstructed encryption key is saved in Rights Management module for later use. The protected content is stored in local storage in the CPCM device in unit 12.

In the FIG. 5 for the case of content distribution, the protected content with its CPCM information is passed to Rights Management (RM) module in the unit 1, and CPCM Rights Holder will be retrieved in this module. Usage Rules and possibly the license key are carried in the CPCM Rights Holder. In the first step in the unit 2 as shown in FIG. 5, RM checks CPCM_DomianID carried in CPCM Rights Holder against the CPCM_DomianID which has registered into user's CPCM device, to verify whether this device is in the Authorized Domain and is eligible to consume the content.

If the above result is negative, then the RM will generate an output message saying: you are not in authorized domain, as shown in unit 3.

If the above result is positive, then the RM will retrieves the license Key either from Rights Holder or smart card in unit 4 to be ready for decrypting the encrypted encryption key which is carried in the CPCM Stream.

In the next step, the RM will check user's request or preference between Play or Play & Copy in unit 5.

In the case of "Play only" requested by user, the retrieved License Key in unit 4 will be passed to unit 8 for decrypting the encrypted encryption key. The following step is to de-scramble the protected content in unit 9 and playback the content in unit 10.

In the case of Play & Copy request by user, the RM will retrieve the Usage Rules in unit 6 to verify whether there is copy right to save the current content (or program in broadcasting case) in the storage in the complaint CPCM device.

If the above result is negative, then the RM will generate an output message saying: Copy/Move is prohibited, as shown in unit 7.

If the above result is positive, then the retrieved License Key in unit 4 will be passed to unit 8 for decrypting the encrypted encryption key. The following step is to de-scramble the protected content in unit 9 and playback the content in unit 10. At the same time, in unit 11 the reconstructed encryption key is saved in Rights Management module for later use. The protected content is stored in local storage in the CPCM device in unit 12.

Figure 6:
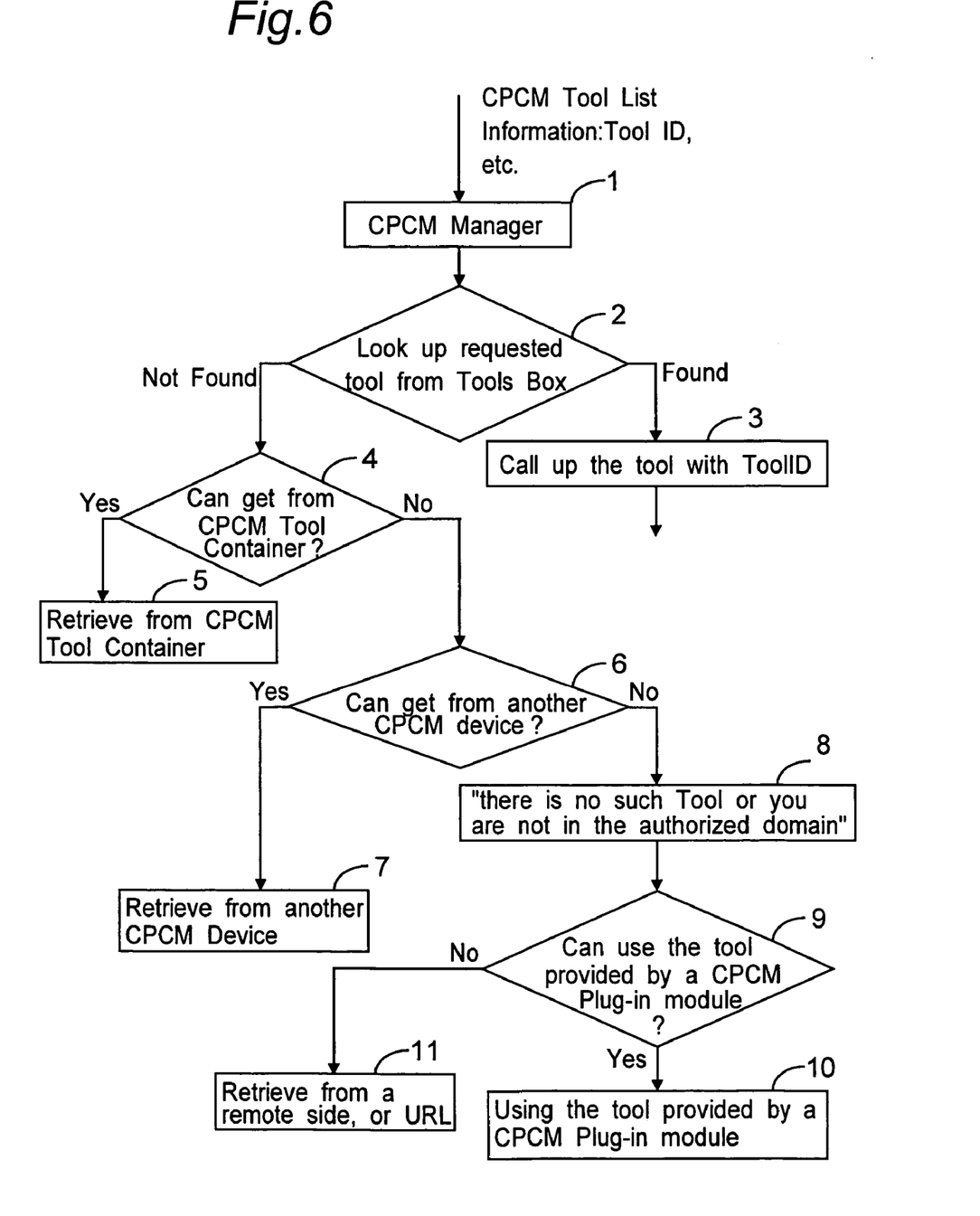
FIG. 6 shows Illustration of the Tool Retrieving Function of CPCM Manager.

In FIG. 6, it is shown how CPCM Manager retrieves a tool, and obtains a missing tool in different ways.

As in FIG. 6, CPCM Tool List is passed to CPCM Manager module in unit 1 to retrieve the requested tool. In unit 2 Tools Box will be looked up to search for the requested tool. If the requested tool exists in the Tools Box, the tool will be activated for functioning in unit 3. Otherwise the CPCM Tool Container will be checked if it exists, shown in unit 4.

If the requested tool can be found in unit 4, then the tool will be retrieved from the CPCM Tool Container and saved in the Tools Box in unit 5. Otherwise the requested tool will be obtained from another CPCM device by sending a request message in unit 6.

If the tool request is accepted, then the tool will be transferred over and saved in the Tools Box in unit 7. Otherwise the reply message will tell the reasons for the failure in unit 8.

In unit 9 a CPCM Plug-in module will be checked to see if there is such requested tool to use. If no, the requested tool has to be retrieved from remote side via a return channel, URL, or other means in unit 11.

2) In the Case Content is Protected and Managed by a Private CAS System:

Content will be encrypted by control word in an ECM, and transmitted with their own format of EMM, to DVB CPCM STB.

Since ECM and EMM are based on the private format of the CAS system, so a corresponding private CAS module is required in the DVB STB to decrypt and process the protected content.

As shown in FIG. 2, a CPCM plug-in module (CAS-CPCM converter), such as Smart Card with DVB compliant Common Interface (CI), is provided by the CA vendor to receive and playback such content.

Communications between a CAS-CPCM converter module and the Baseline DVB-CPCM module in the compliant CPCM device is realized across a DVB compliant Common Interface (CI). CAS is Conditional Access System.

Next, mapping between CA system and Baseline DVB-CPCM for Storage is described.

In the case if the content is just for playback, there is no necessity to conduct mapping. However, in the case if the content is granted to store in the DVB CPCM STB for future transferring in the authoring domain, a CAS-CPCM converter module with DVB compliant Common Interface (CI) is required to map the Usage Rules used in the private CA system to CPCM format for the Usage Rules. Besides mapping usage rules, the content also needs to be decrypted by the private CA system, and then be encrypted again by the Baseline DVB-CPCM, to store in the STB in an encrypted form together with their CPCM Control information (CPCM Tool List, CPCM Rights Holder, etc) as well as CPCM Stream to hold the encryption key and other relevant information. The following table shows the Functions of Each Modules Illustrated in FIG. 2 for the end to end solution.

TABLE 1

Functions of Each Modules Illustrated in FIG. 1

| Module Name | Functions |
|---|---|
| Operator/Server Side | |
| Rights Authoring Tool | Editing of XML based Usage Rules and converting it into Binary format |
| Content Authoring Tool | Encoding and editing the content |
| Watermarking Tool | Embedding watermark on video or audio |
| MPEG-2 Encoder | Creating MPEG-2 compliant Audio/Video/System streams |
| CPCM Control Information Encoder | Creating CPCM Tool List, CPCM Rights Holder Descriptor, CPCM Tool Container, CPCM Control Graph |
| CPCM Tools | Encrypting a stream, hashing of CPCM Control Information, etc. |
| Usage States & Rules Encoder | Selecting and encoding usage rules based on user's subscription and DomainID, etc. |
| CPCM Stream Generator | Encrypting the encryption key to generate CPCM Stream. Other information that a CPCM tool needs can also be put in CPCM stream with proper timestamp. |
| Private CAS | Operation of any proprietary CA system. |
| Receiver/Client Side | |
| Baseline DVB-CPCM | A Standardized Unit consisting of several submodules that does CPCM functions in a compliant CPCM Device |
| CPCM Manager | Managing tools box, parsing tool list, retrieving CPCM tools; Content and Domain management; |
| Tools Box | Holding all existing CPCM Tools; Performing CPCM Tools function; |
| Rights Management | Parsing Binary (XML optional) based Usage Rules carried in Rights Holder Descriptor, and controls the consumption or copy of content. |
| Message Router | A conceptual entity within Baseline DVB-CPCM that provides Messaging Interface between proprietary CPCM tools or compliant CPCM Devices. |
| CAS-CPCM converter | Conversion of Proprietary CAS Usage Rules into CPCM Usage Rules (CPCM Rights Holder Descriptor) across DVB Common Interface (CI), Re-Encryption, forming of CPCM Stream. |

Next, Baseline DVB-CPCM used in Transmission between CPCM Devices is described.

Figure 7:
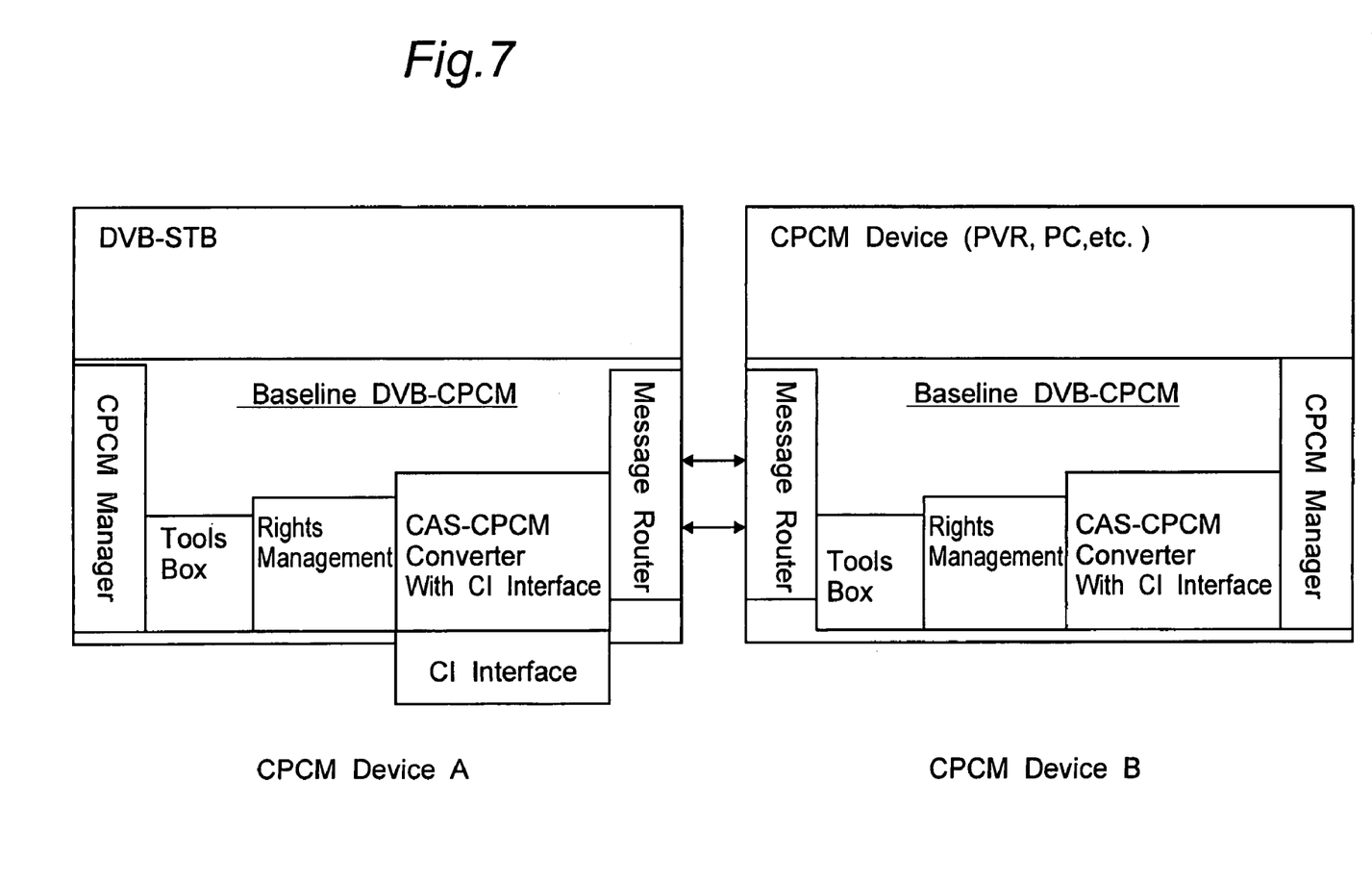
FIG. 7 shows Content Transmission between CPCM Devices.

Transmission between two compliant CPCM devices is realized through a standardized Baseline DVB-CPCM module Message Router that is pre-implemented in all CPCM devices. The communication is through messaging. interface to provide interoperability, as shown in FIG. 7.

Messages via Message Router (MR) provide the following transmissions between CPCM devices:

Content transferring from one to another;

CPCM Tool transferring from one to another;

The following identifications are defined to use for content management and user database management during content transferring and rights authentication.

TABLE 2

Parameters defined for Content Transferring in Authorized Domain

| IDs defined for Content Management and Authorized Domain or User Database Management | Definition and Usage |
| --- | --- |
| ContentID | An identifier assigned to each content for content management |
| CPCM_DeviceID | An identifier assigned to each CPCM compatible device to use as address for sending and receiving messages. |
| CPCM_DomainID | An identifier may obtain from Operator upon user registration and used for several CPCM Devices in the same Authorized Domain. |

It is assumed that an encrypted content is stored in CPCM Device A with CPCM Rights Holder containing its Usage Rules and the encryption key.

1) Content Request Message Sending from CPCM Device B to CPCM Device A

Now CPCM Device B sends message via Message Router to request certain content with the ContentID/ProgramNumber or possible elementary PIDs, as well as its CPCM_DomainID. Besides these parameters, CPCM Device B also generates one pair of keys and sends the PublicKey together with the above parameters to CPCM Device A, shown as in table 3.

TABLE 3

Content Request Messages

| Messages | Length | Notes |
| --- | --- | --- |
| ContentID/ProgramNumber | 4 bytes | |
| CPCM_DomainID | 4 bytes | |
| PublicKey | 16 bytes | |

2) Verification—Mutual Authentication

Then, the CPCM Device A receives this message with all the parameters, searches ContentID/ProgramNumber in the storage, and verifies CPCM_DomianID against its CPCM_DomianID by CPCM Rights Management module in the Baseline DVB-CPCM. At the same time it checks the usage rules for the requested content/program, and finally grants copy or move right by sending a reply message to CPCM_Device_B.

The reply message format is shown in Table 4, including error reporting.

TABLE 4

Response Message for Content Request

| Reply Message & Codes | | Error Reporting | Note |
| --- | --- | --- | --- |
| No | 00 | No such content. | |
| No | 01 | You are not in the authorized domain. | |
| No | 10 | Prohibit in Copy/Move mode | |
| Yes | 11 | Transferring is allowed | |

3) On-line Encryption for the Encryption Key to create CPCM Stream

After finishing the above Rights Authentication, the encryption key stored together with the content in CPCM Device A, will be encrypted by the PublicKey received from CPCM Device B to form a CPCM Stream.

4) Content Transferring from CPCM Device A to CPCM Device B

Now the requested content, together with Usage Rules (may changed) and the formed CPCM Stream, is transferred from CPCM Device A to CPCM Device B securely via secured channel.

5) Tool Transferring Between CPCM Device A and CPCM Device B

CPCM Manager in CPCM Device B retrieves CPCM Control Information carried in PSI of MPEG-2 TS stream to obtain CPCM Tool List. CPCM Manager checks the CPCM Tool List against with Tools Box in CPCM Device B, and cannot find the Tool indicated by ToolID. This may happen for the case where a new or upgraded CPCM Tool is used but the CPCM Device B does not implement.

In this case CPCM Device B has three ways to obtain the missing CPCM Tool.

a) CPCM Device B sends Tool Request Message to CPCM Device A via Message Router, to request the Tool with the ToolID. At the same time it also sends its CPCM_DomainID to CPCM Device A. The Tool Request Messages format is shown as in Table 5.

TABLE 5

Tool Request Message Format

| Tool Request Message | Length | Note |
| --- | --- | --- |
| ToolID | 2 bytes | |
| CPCM_DomainID | 4 bytes | |

CPCM Device A receives the Tool Request Message, it may choose to do a mutual authentication with Device B, and checks Tools Box with the ToolID for the transferring permission status as shown in Table 6.

TABLE 6

Tool Description in a Tools Box of CPCM Device

| ToolID | Number | Function | Source | Status for Transferring |
| --- | --- | --- | --- | --- |
| 00000001 | 1 | Encryption1 | Pre-implemented | No |
| 00000002 | 2 | Encryption2 | Pre-implemented | No |

TABLE 6-continued

Tool Description in a Tools Box of CPCM Device

| ToolID | Number | Function | Source | Status for Transferring |
|---|---|---|---|---|
| 00000004 | 4 | Encryption3 | Pre-implemented | Yes |
| 00000006 | 6 | Digital Sign | Pre-implemented | Yes |
| 000000010 | 10 | Watermarking Embedding | Pre-implemented | No |
| 000000011 | 11 | Watermarking Embedding | Pre-implemented | Yes |
| 000000012 | 12 | Watermarking Detection | Pre-implemented | Yes |
| 000000020 | 20 | Encryption20 | Loaded from CPCM Device | Yes |
| 000000021 | 21 | Encryption21 | Loaded from Content Stream | Yes |
| 000000022 | 22 | Encryption22 | Loaded from Plug-in module | Yes |
| 000000023 | 23 | Encryption23 | Loaded from Remote URL | Yes |

If the status is yes, then CPCM Device A will send reply to CPCM Device B, followed by sending the Tool with its associated description to CPCM Device B.

b) As shown in table 6, the missing tool also can be retrieved from the content stream carried in CPCM Tool Container;
c) As shown in table 6, the missing tool also can be obtained from another CPCM device;
d) As shown in table 6, the missing tool also can be retrieved from the remote URLs via a return channel or other means, which is out of this scope of the proposal;

Next standardized components in the baseline DVB-CPCM is described.

Those function modules used in a Baseline DVB-CPCM are listed in the Table 7 below.

TABLE 7

Function Module of Baseline DVB-CPCM

| Module Name | Function Description | Suggestion |
|---|---|---|
| 1. CPCM Manager | Content Management Authorized Domain Management CPCM Control Information Retrieval (Tool List, CPCM Rights Holder, Tool) | normative |
| 2. Tools Box | Holding CPCM Tools and their Description Performing Tool's Function | normative |
| 3. Rights Management | Parsing Usage States & Rules (from Rights Holder Descriptor in CPCM Control Information) and Storing them in a secure table with its ContentID | normative |
| 4. Message Router | Providing message interface to CPCM devices; Routing messages between proprietary CPCM tools (CPCM plug-ins) and device; Routing messages between CPCM devices. | normative |
| 5. CAS-CPCM converter | Transcoding Proprietary Usage Rules into CPCM Rights Holder Descriptor via CI; Controlling re-encryption using CPCM Tools in Tool Box for storage; Forming CPCM Stream. | Optional for CPCM Devices; Used for backward Compatibility for private CAS; |
| All Types of Message Format | | |

As shown in the Table 7, except the last module, all other five modules including their functions and behaviors, are needed to be normative and standardized to provide worldwide interoperability.

The message format from/to Message Routers between CPCM devices and proprietary CPCM tools (plug-ins) will be normative, and it is used for Content transferring, Tool transferring, mutual authentication between CPCM devices, as well as interfacing with CPCM plug-ins.

Interfaces between different modules inside a Baseline DVB-CPCM are not defined here, and it is implementation matter. Even the interface between Baseline DVB-CPCM and DVB STB is also not defined here as long as Baseline DVB-CPCM fulfils all the functions that are defined here.

The invention claimed is:

1. Apparatus of a Baseline DVB-CPCM (Digital Video Broadcasting for Content Protection and Copy Management) on sender side used in a complete business environment, said apparatus distributing a CPCM protected content in which content protection and copy management (CPCM) information for CPCM is attached to an encrypted content stream, said apparatus comprising:
   means for generating said encrypted content stream on the content owner side or operator side;
   means for generating said CPCM information which specifies an authorized domain which is authorized to perform one of reproduction and copy of said CPCM protected content;
   means for generating said CPCM protected content by attaching said CPCM information to said encrypted content stream; and
   means for delivering said CPCM protected content.

2. Apparatus of a Baseline DVB-CPCM for generating content protection and copy management (CPCM) control information and generating content protection and copy management (CPCM) stream in claim 1, comprising:
   means for forming a Tool List as CPCM Tool List to list all the tools used to protecting said content by using a tool ID (identifier) to be assigned to any tool used for protecting said content including such as encryption, watermarking embedding, watermarking detecting, digital signing;
   means for creating CPCM Rights Holder by including usage rules, copy rights, etc. which is related to said content in a specific format;
   means for creating a CPCM Control Graph to tell a protection sequence using different tools in different position;
   means for creating a CPCM Tool Container to carry a CPCM tool with certain CPCM Tool ID;
   means for forming a CPCM Stream to carry key information, control information, and time stamp information which are related to those information of using said tools to protect said content.

3. Apparatus of a Baseline DVB-CPCM (Digital Video Broadcasting for Content Protection and Copy Management) on receiver side, comprising:
   means for receiving a CPCM protected content stream with its CPCM information and CPCM stream in CPCM device, said CPCM information specifying an authorized domain which is authorized to perform one of reproduction and copy of said CPCM protected content;
   means for retrieving said CPCM information by said CPCM device to verify against pre-registered information in a Baseline DVB of said CPCM device to see whether said CPCM device is in an authorized domain;

means for retrieving said CPCM information by said CPCM device to decrypt said encrypted content stream;

means for storing the content in a protected form in said CPCM device; and means for transferring the CPCM protected content from said CPCM device to another complaint CPCM device in a secure manner, after authenticating they are belong to the same authorized domain.

4. Apparatus of a Baseline DVB-CPCM (Digital Video Broadcasting for Content Protection and Copy Management) used for end-to-end solution on sender side, comprising:

means for generating a CPCM protected content stream on the content owner side or operator side;

means for forming a Tool List as CPCM Tool List to list all the tools used to protecting said content by using a tool ID code to be assigned to any tool used for protecting said content including such as encryption, watermarking embedding, watermarking detecting, digital signing;

means for creating CPCM Rights Holder by including usage rules, copy rights, etc. which is related to said content in a specific format;

means for creating a CPCM Control Graph to tell a protection sequence using different tools in different position;

means for creating a CPCM Tool Container to carry a CPCM tool with certain CPCM Tool ID;

means for forming a CPCM Stream to carry key information, control information, and time stamp information which are related to those information of using said tools to protect said content;

means for placing said CPCM information including CPCM Tool List, CPCM Rights Holder, CPCM Control Graph, CPCM Tool Container, as well as CPCM Stream in the system layer in the specified location and specified format, together with said CPCM protected content stream;

means for assigning Content ID as content identifier for content management on both operator side and user side; and means for delivering said CPCM protected content with its said CPCM information to CPCM device in a secure manner, said CPCM device belonging to said authorized domain set by specifying CPCM_DomainID as CPCM Domain Identifier for authorized domain management.

5. Apparatus of a Baseline DVB-CPCM for generating a protected content stream on the content owner side or operator side in claim 3, further comprising:

means for embedding copy control information in a content using said CPCM tools, such as watermarking, if there is such requirement;

means for encoding a content based on existing formats such as MPEG-2 using encoding tools, to form a content stream;

means for encrypting said content stream using said CPCM tool to form a protected content.

6. Apparatus of a Baseline DVB-CPCM (Digital Video Broadcasting for Content Protection and Copy Management) on receiver side, comprising:

means for receiving a transmitted content by a CPCM device;

means for authorizing said CPCM device to see whether it belongs to said authorized domain;

means for retrieving said CPCM information included in said transmitted content by said CPCM device to obtain said protection information;

means for verifying said usage rules of content by said CPCM device before taking action on user's request;

means for decrypting said CPCM protected content using said retrieved CPCM information by calling up CPCM tools from said CPCM device or a proprietary CPCM Plug-in module if the requested CPCM tool is missing in said CPCM device;

means for playing back said decrypted content to said user; and means for storing the CPCM protected content with its CPCM information in said CPCM device if said user has such request.

7. Apparatus of a Baseline DVB-CPCM (Digital Video Broadcasting for Content Protection and Copy Management) used for content transferring between devices, comprising:

means for setting a set of messages for content transferring with the data structure for several parameters used for content transferring;

means for receiving a Content Request Message which is sent with several defined parameters by CPCM device B to request a content transferring from CPCM device A;

means for verifying said several parameters received by said CPCM device A with the data pre-saved in said CPCM device A which is CPCM information specifying an authorized domain which is authorized to perform one of reproduction and copy of said CPCM protected content, to authenticate whether said CPCM device A and B are in the same domain, whether the requested content is in said CPCM device A, whether there is such copy/move rights attached to said content;

means for sending a Content Response Message with several reply messages for different cases by said CPCM device to said CPCM device B, after the above said verification; and means for sending the requested content from said CPCM device A together with its CPCM information to said CPCM device B in a secure manner if the above said reply is positive.

8. Apparatus of a Baseline DVB-CPCM for sending a Content Request Message with several defined parameters by a CPCM device B to request a tool transferring from another CPCM device A in claim 7, further comprising:

means for sending a Content Request Message with the ContentID for the requested content, the CPCM_DomainID for domain authentication, and the PublicKey for using to encrypt encryption key.

9. Apparatus of a Baseline DVB-CPCM (Digital Video Broadcasting for Content Protection and Copy Management) used for CPCM tool transferring, comprising:

means for setting a set of messages for tool transferring with the data structure for several parameters used for tool transferring;

means for sending a Tool Request Message with several defined parameters by CPCM device B to request a tool transferring from CPCM device A;

means for verifying said several parameters received by said CPCM device A with the data pre-saved in said CPCM device A which is CPCM information specifying an authorized domain which is authorized to perform one of reproduction and copy of said CPCM protected content, to authenticate whether said CPCM device A and B are in the same domain, whether the requested tool is in said CPCM device A, whether the requested tool is allowed to transfer to another CPCM device;

means for sending a Tool Response Message with several reply messages for different cases by said CPCM device to said CPCM device B, after the above said verification; and means for sending the requested tool from said CPCM device A together with its status for transferring to said CPCM device B in a secure manner if the above said reply is positive, wherein said CPMP device B retrieves said CPCM tool from other sources if the above said reply is negative.

10. Apparatus of a Baseline DVB-CPCM for sending a Tool Request Message with several defined parameters by a CPCM device B to request a tool transferring from another CPCM device A in claim 9, further comprising means for sending a Tool Request Message with the ToolID for the requested tool, the CPCM_DomainID for domain authentication, and the PublicKey for using to encrypt said tool.

11. Apparatus of a Baseline DVB-CPCM for retrieving said CPCM tool from other sources if the above said reply is negative in claim 9, further comprising:

means for downloading from said other sources via a return channel, a defined URL, or other means in a secure manner.

12. Apparatus of a Baseline DVB-CPCM for sending a Content Request Message and sending Tool Request Message in claim 7, further comprising:

means for using a defined CPCM_DeviceID as CPCM Device Identifier for its CPCM devices within the same authorized domain;

means for using said CPCM_DeviceID to send a message to a CPCM device that has said CPCM_DeviceID, and at the same time using another CPCM_DeviceID for the message sender's address.

13. Apparatus of a Baseline DVB-CPCM (Digital Video Broadcasting for Content Protection and Copy Management) comprising:

CPCM Manager module for the Baseline DVB-CPCM, to retrieve CPCM information that is placed in a system layer of a received content stream, and to process said CPCM Too List information and retrieve CPCM tools indicated by ToolID in said CPCM Tool List;

Rights Management module for the Baseline DVB-CPCM, to retrieve said CPCM Rights Holder information for domain authentication, usage rules verification, and session key delivery if it is necessary;

Tools Box module for the Baseline DVB-CPCM, to hold the possible defined CPCM tools or tools transferred and retrieved from other sources, and to activate the requested tool for performing its function;

Message Router module for the Baseline DVB-CPCM, to use for message interface for sending and receiving message between CPCM devices, especially for communication between a compliant CPCM device and a proprietary CPCM Plug-in module;

CAS-CPCM Converter module for the Baseline DVB-CPCM, to use for converting usage rules set by an existing CA (Conditional System) system across the DVB compliant common interface (CI) for backward compatibility;

Key Generator module for the Baseline DVB-CPCM, to generate a pair of keys for secure content transferring.

14. Apparatus of a Baseline DVB-CPCM for sending a Content Request Message and sending Tool Request Message in claim 9, further comprising:

means for using a defined CPCM_DeviceID as CPCM Device Identifier for its CPCM devices within the same authorized domain;

means for using said CPCM_DeviceID to send a message to a CPCM device that has said CPCM_DeviceID, and at the same time using another CPCM_DeviceID for the message sender's address.

* * * * *

UNITED STATES PATENT AND TRADEMARK OFFICE
CERTIFICATE OF CORRECTION

PATENT NO. : 7,299,362 B2
APPLICATION NO. : 10/490394
DATED : November 20, 2007
INVENTOR(S) : Shen et al.

It is certified that error appears in the above-identified patent and that said Letters Patent is hereby corrected as shown below:

Column 15, line 51 (claim 5, line 3) of the printed patent, "claim 3" should be --claim 4--.

Column 17, line 20 (claim 10, line 4) of the printed patent, "comprising" should be --comprising:--.

Column 18, line 7 (claim 13, line 7) of the printed patent, "Too" should be --Tool--.

Signed and Sealed this

Twenty-fourth Day of June, 2008

JON W. DUDAS
*Director of the United States Patent and Trademark Office*